: 3,057,712
PROCESS OF PREPARATION OF A NEUTRAL
MANGANESE COMPOSITION
Alexander A. Nikitin, College Park, and Charles C. Fite, Jr., East Point, Ga., assignors to Tennessee Corporation, New York, N.Y., a corporation of New York
No Drawing. Filed Jan. 23, 1959, Ser. No. 788,517
6 Claims. (Cl. 71—63)

This invention relates to the provision of an improved manganese plant nutrient in the form of a neutral and stable composition in which the manganese retains its divalent form and which does not readily hydrolyze in water suspension. Such a composition supplies manganous ion at the slow, steady rate necessary for plant nutrition and is thus effective in both soil and foliar application.

Intensive cropping, which is increasingly employed because of the high cost of labor, has resulted in serious deficiencies of plant nutrients in soils so cultivated, and in many cases it has been found desirable, in order to correct trace element deficiencies, to supplement soil applications with additional spray treatment of the foliage of various crops such as vegetables, fruits, pasture crops, and ornamentals. This new method of treatment has created entirely new problems which do not arise in the case of soil applications, and neutral compounds of copper, zinc, and iron have been developed to meet these needs; but, so far, no suitable manganese compound or composition has been developed which is both safe and effective for foliar treatment.

To be suitable for this purpose a manganese compound or composition should retain its manganese indefinitely in the divalent form, should be stable to hydrolysis in water suspension, and should have a character of reaction in the range of pH 6.5–7.0. It is essential that the manganese retain its divalent form, since this is the only form in which it is readily available and effective as a plant nutrient. The product must also be neutral, first in order to be compatible with other spray materials which are decomposed by excess alkalinity, such as fungicides and insecticides, and also to avoid decomposition of the manganese compound or composition itself due to such excess alkalinity and the resultant formation of manganic oxide ($MnO_3$) and manganese dioxide ($MnO_2$), which are ineffective for plant nutrition.

The two manganese compounds used most extensively heretofore as plant nutrients are manganous sulfate ($MnSO_4$) and manganous oxide (MnO). These compounds have been used chiefly in soil applications, however, and neither of them alone, nor even a mixture of the two, is suitable for foliar treatment for the following reasons:

Manganous sulfate ($MnSO_4$) has an acid character of reaction of about pH 4.1–4.3 and is therefore injurious to foliage. Furthermore, it is completely soluble in water so that, when used alone as a spray, it is too readily removed from the foliage by rain. If not so removed, however, an excess of the sulfate group is readily assimilated by the foliage. This sulfate group causes foliar injury by interfering with metabolic processes involving the nitrate and phosphate anions and thus largely deprives the plant foliage of these two essential nutrients.

Because of its extremely high solubility, moreover, manganous sulfate supplies excessive amounts of manganese which are very toxic to plants. Manganese accelerates the oxidation processes within plant tissues, and especially the oxidation of iron; manganese thus causes iron deficiency which, in turn, results in chlorosis due to faulty chlorophyll formation.

Manganous oxide (MnO) is effective for the correction of manganese deficiencies in acid soils, but used when in sprays in combination with other agricultural products, its high alkalinity greatly reduces the effectiveness of materials such as the organic fungicides and insecticides which are sensitive to alkaline conditions. Consequently growers often refuse to apply MnO in combination with fungicides and insecticides, and separate spray applications of nutrient manganese compounds and pesticides are required which must be carefully timed to correspond with phases of plant growth when the respective materials are needed most. The result is a heavy increase in the cost of labor.

Also, the high alkalinity of MnO tends to cause the oxidation of manganese itself in water suspension to oxides which are inert for plant nutrition. The MnO which escapes this oxidation will injure the foliage, because plant sap, in most cases, has a slightly acid character of reaction; and when MnO penetrates into plant cells, it increases the pH of the sap and precipitates other nutrients. Thus, MnO disturbs the normal biological processes; and these, in turn, affect the assimilation of oxygen which is essential for plant respiration. The result is the development of visible symptoms of manganese toxicity as foliar injury progresses.

In mixtures of $MnSO_4$ and MnO, each component behaves as if it were used alone. For example, $MnSO_4$, being so soluble, either causes manganese toxicity by furnishing excessive amounts of manganese, or is too readily removed by rain, where it is not effective at all.

Manganese carbonate ($MnCO_3$) is another manganese compound which is not entirely suitable for foliar treatment. Although it is only slightly soluble in water (0.01% in tap water) and is neutral, it begins to decompose in slightly acid media. Thus it is not compatible with any of the spray materals having a character of reaction which is on the acid side of neutrality, in which $MnCO_3$ has proved to be rather unstable.

A group of so-called "basic manganese" compounds have been prepared by methods which employ strong alkaline materials, such as the hydroxides and carbonates of sodium or potassium, or ammonia released by urea for the precipitation of soluble manganese salts such as manganous sulfate. But none of these methods can be used to prepare a neutral manganese compound or composition that is satisfactory for the purposes of the present invention because excess alkalinity simply converts the manganese into the higher manganese oxides which are practically inert as far as plant nutrition is concerned.

The chief object of the present invention is to provide a novel manganese composition that is entirely suitable for safe and effective foliar treatment and also compatible with fungicidal and insecticidal materials, i.e., a composition having the following combination of properties:

(1) The character of reaction of the product should be neutral, i.e., the pH should remain within the limits 6.5–7.0. This neutrality is important for the following reasons:

(a) To avoid excess acidity which causes injury to plant foliage and which eventually corrodes spray nozzles.
(b) To provide compatibility with organic fungicides and insecticides, and thus avoid the expense of separate foliar applications of nutrients and pesticides.

(2) The neutral manganese composition should not be too soluble, i.e., it should be stable against hydrolysis. This is important because:

(a) Such a composition is effective for longer periods of time, since rains do not remove it from foliage as readily as more soluble materials such as $MnSO_4$.
(b) Such a composition does not furnish excessive amounts of sulfate ion which would interfere with the metabolism of the essential nitrate and phosphate nutrients.

(c) Such a composition would not furnish excessive amounts of manganese which are toxic.

(3) The manganese in such a composition should be retained in the divalent form, since this is the only form which is readily available to plants for nutrition.

We have found that novel manganese compositions having the above properties can be obtained by suitably controlling the reaction between soluble manganous salts of certain mineral acids (i.e., sulfuric, nitric, and hydrochloric acids) and manganous oxide (MnO). For convenience, these soluble manganous salts can each be referred to as MnA where A represents $SO_4$, $Cl_2$, or $(NO_3)_2$. Broadly speaking, reaction products of this type are known but when these known products are placed in aqueous media hydrolysis takes place with liberation of MnO and the resultant high alkalinity causes oxidation of the divalent manganous ions to manganese ions of higher valency. This hydrolysis and liberation of the reagents initially used proceeds readily when the compound is mixed with cold water and agitated in making up a spray, and much more readily when warm water is used in the spray tanks according to the common practice.

Our investigations have shown that stability of the reaction product to hydrolysis increases as the proportion of soluble manganous salt to MnO in the reaction product increases, and that this proportion in the reaction product in turn increases as the concentration of the soluble manganous salt in the reaction medium increases. Our investigations have also shown that stability is markedly influenced by the reaction temperature and increases greatly when the temperature is above a minimum of about 190° F. At atmospheric pressure, the temperature may have any value from about 190° F. up to the boiling point of the reaction slurry. In an autoclave or other pressure equipment the temperature may be increased to any value at which the manganese compositions remain stable, say 275°–300° F., but operation under atmospheric pressure is preferred since there is no need for elaborate and expensive mechanical equipment. Thus we have obtained reaction products of the above type that are both neutral and stable to hydrolysis by reacting the soluble manganese salt and the manganous oxide in a reaction medium in which the soluble manganese salt is present in relatively high concentration and at a reaction temperature above 190° F.

Reaction products useful for the purposes of the present invention should contain a minimum molar ratio of manganese in the form of the soluble manganous salt MnA to manganese in the form of MnO of 1:1. As shown by the data set forth hereinafter, this minimum ratio is necessary to provide adequate stability of the reaction product against hydrolysis. Stability increases as this molar ratio increases up to 1.4:1 or 1.5:1, and as already stated, this ratio can be increased by increasing the concentration of the soluble manganous salt MnA in the reaction medium. Also the said molar ratio can be further increased substantially by increasing the molar ratio of Mn in the starting reactants, i.e., the ratio of Mn in the initial MnA to Mn in the initial MnO. On the other hand, greater stability is thus secured at the expense of some decrease in the extent of completion of reaction.

We have found that the required minimum value of 1:1 of the molar ratio of Mn as MnA to Mn as MnO is obtained in the reaction product, and that the results are otherwise acceptable, when the concentration of soluble manganous salt (MnA) in the reaction medium is in the range of 1.8 moles per liter up to saturation; when the proportion of the initial reactant MnA to the initial reactant MnO is such as to provide an initial molar ratio of Mn in MnA to Mn in MnO within the limits of 1:1 to 5:1; and when the temperature of the reaction is maintained between 190° F. and the boiling point of the reaction slurry which under atmospheric pressure may be as high as about 220° F.

For practical purposes, in order to provide a satisfactory yield with good stability, it will be desirable in most cases to operate at intermediate values within the above limits; for example—

(1) A concentration of MnA in the reaction medium of about 3.5–4.7 moles per liter.

(2) An initial molar ratio of Mn in MnA to Mn in MnO of about 1:1 to 2:1. In the cases of the manganous salts named above, the same molar ratio obviously exists between the reactants themselves, i.e., MnA to MnO.

(3) A temperature between 200° F. and 220° F.

Under the above stated practical operating conditions, the molar ratio of Mn as MnA to Mn as MnO in the reaction product will be within the aforesaid limits of 1:1 to 1.5:1.

The reactants, preferably in finely divided form, are mixed in water and heated to the proper temperature, say 200°–205° F. with agitation for a suitable period, say one half hour or more, after which the reaction mixture is cooled and the solid material filtered off and dried.

Upon analysis of reaction products obtained in the above manner, the extent of reaction and the composition of the reaction product can be indicated in terms of the molar ratio of the anion of the soluble salt ($A^{--}$) to the total manganese considered as MnO. After leaching the reaction product, the degree of stability of the product to hydrolysis is indicated by the amount of loss of the anion. For example, in the case of the reactants $MnSO_4 \cdot H_2O$ and MnO, the reaction product will contain both reactants. The minimum molar ratio of 1:1 specified above between Mn as $MnSO_4$ and Mn as MnO corresponds to a molar ratio of $SO_4$ to total MnO of 0.5 (ratio of 0.677 on a weight basis). The decrease in this ratio due to leaching indicates the amount of hydrolysis taking place with accompanying liberation of $MnSO_4$ and MnO and the resultant undesirable effects already mentioned.

For economic reasons, the manganous oxide may be commercial reduced ore obtained by reducing manganese dioxide ore by roasting according to known processes. The reduced product best suited for use in the present invention should contain a minimum amount of $MnO_2$ which does not react with the soluble manganous salt MnA under ordinary conditions. Hence the ore should preferably be reduced as completely as possible. Since the presence of impurities such as ferric oxide ($Fe_2O_3$) may detract from the stability of the manganous oxide against oxidation, the presence of such impurities should be avoided insofar as possible.

The invention is exemplified by the following description and tabulations of the results obtained in the case of $MnSO_4$, the preferred soluble manganous salt for economic reasons and because of its ready availability on the market. The manganous sulfate employed in the tests contained 30.7% Mn and 17.9% S. The MnO was a commercial reduced ore originally composed chiefly of manganese dioxide ($MnO_2$) which had been reduced by roasting with coke in a kiln at a temperature near 2000° F.; this reduced ore contained 48% divalent Mn.

Various amounts of the above described reagents were reacted at the constant ratio of the starting materials $$\frac{\text{Mn in MnSO}_4}{\text{Mn in MnO}} = 2$$

in order to determine the effects of relatively low temperature (Table I below) and of increasing concentration of $MnSO_4$ in the reaction medium (Table II below). In additional tests this ratio was varied (Table III below) to determine its effect on reactivity and efficiency of reaction.

The manganous sulfate was dissolved in water and the resulting solution was adjusted to a volume of one liter and heated to 150°–165° F. in some cases (Table I) and to 190°–205° F. in others (Tables II and III). Dry manganous oxide powder was added to the solutions of manganous sulfate in the proportions shown in the tables, while vigorous agitation was maintained, and the temperature of the resulting slurries of manganous sulfate and manganous oxide was held at the specified values throughout the entire period of reaction which was 30 minutes. Upon completion of the reaction, the reaction products were cooled and allowed to settle, and the solid material was filtered off and dried. These reaction products were analyzed for manganese and sulfur.

To test stability to hydrolysis, 100 grams of the dry, solid reaction product was slurried in 1000 ml. water for one hour at room temperature. The resulting slurries were filtered, and again the dry, solid residues were analyzed for manganese and sulfur.

The results obtained are set forth in the following tables:

to MnO), the reactivity between $MnSO_4$ and MnO increases. This is shown by the increasing sulfur content (actually in the form of sulfate) in the reaction product before leaching, as shown by the increasing values of the ratio $SO_4/MnO$.

Comparison of Tables I and II also shows that by increasing the temperature, the reactivity between $MnSO_4$ and MnO is greatly increased. This is shown by the consistently high sulfur content and high value of the ratio $SO_4/MnO$ of the reaction products in Table II, prepared at 190°–205° F.; there was some increase with increasing concentrations of $MnSO_4$, but the ratio $SO_4/MnO$ was very high at all concentrations including even the lowest concentration. These tables also show that the effects of reduced concentration are much greater

TABLE I
Effect of Temperature and Concentration of $MnSO_4$ in Reaction Medium

[Temperature of Reaction: 150°–165° F.]

| Materials used, moles | | pH (slurry after reaction) | Analysis of product before leaching | | | | pH (leachate) | Analysis of product after leaching | | | |
|---|---|---|---|---|---|---|---|---|---|---|---|
| $MnSO_4 \cdot H_2O$ | MnO | | Mn, percent | S, percent | Molar ratio | | | Mn, percent | S, percent | Molar ratio | |
| | | | | | $SO_4/MnO$ | Mn as $MnSO_4$/Mn as MnO | | | | $SO_4/MnO$ | Mn as $MnSO_4$/Mn as MnO |
| 3.49 | 1.71 | 6.70 | 37.0 | 11.7 | 0.542 | 1.19 :1 | 8.0 | 42.6 | 5.1 | 0.205 | 0.25 :1 |
| 2.80 | 1.37 | 7.20 | 40.6 | 7.9 | 0.334 | 0.50 :1 | 8.1 | 44.8 | 2.9 | 0.108 | 0.13 :1 |
| 2.24 | 1.10 | 7.40 | 42.5 | 6.3 | 0.254 | 0.34 :1 | 8.1 | 45.9 | 1.3 | 0.049 | 0.050:1 |
| 1.86 | 0.92 | 7.60 | 43.2 | 4.0 | 0.159 | 0.19 :1 | 8.2 | 46.6 | 0.9 | 0.033 | 0.033:1 |
| 1.60 | 0.79 | 7.70 | 46.9 | 1.2 | 0.044 | 0.045:1 | 8.2 | 47.8 | 0.5 | 0.018 | 0.019:1 |
| 1.40 | 0.69 | 7.80 | 47.8 | 0.49 | 0.018 | 0.018:1 | 8.3 | 47.9 | 0.4 | 0.014 | 0.015:1 |

NOTE.—1,000 ml. solution in all cases. Molar ratio, Mn in $MnSO_4$ to Mn in MnO, as introduced, constant at 2:1. Reaction time: 30 minutes.

TABLE II
Effect of Temperature and Concentration of $MnSO_4$ in Reaction Medium

[Temperature of Reaction: 190°–205° F.]

| Materials used, moles | | pH (slurry after reaction) | Analysis of product before leaching | | | | pH (leachate) | Analysis of product after leaching | | | |
|---|---|---|---|---|---|---|---|---|---|---|---|
| $MnSO_4 \cdot H_2O$ | MnO | | Mn, percent | S, percent | Molar ratio | | | Mn, percent | S, percent | Molar ratio | |
| | | | | | $SO_4/MnO$ | Mn as $MnSO_4$/Mn as MnO | | | | $SO_4/MnO$ | Mn as $MnSO_4$/Mn as MnO |
| 3.49 | 1.71 | 6.70 | 36.2 | 12.1 | 0.572 | 1.34:1 | 7.70 | 36.6 | 9.8 | 0.458 | 0.85:1 |
| 2.80 | 1.37 | 6.70 | 36.4 | 11.5 | 0.541 | 1.18:1 | 7.80 | 39.0 | 9.2 | 0.404 | 0.68:1 |
| 2.24 | 1.10 | 6.80 | 37.0 | 11.4 | 0.528 | 1.11:1 | 7.80 | 39.6 | 8.8 | 0.381 | 0.62:1 |
| 1.86 | 0.92 | 6.90 | 37.8 | 11.2 | 0.518 | 1.03:1 | 7.85 | 39.6 | 8.0 | 0.346 | 0.53:1 |
| 1.60 | 0.79 | 7.00 | 38.2 | 10.6 | 0.476 | 0.91:1 | 8.00 | 39.7 | 6.3 | 0.262 | 0.37:1 |
| 1.40 | 0.69 | 7.00 | 38.6 | 10.3 | 0.457 | 0.85:1 | 8.05 | 40.9 | 6.2 | 0.260 | 0.35:1 |

NOTE.—1,000 ml. solution in all cases. Molar ratio, Mn in $MnSO_4$ to Mn in MnO, as introduced, constant at 2:1. Reaction time: 30 minutes.

TABLE III
Effect of Various Ratios, Manganous Sulfate to Manganous Oxide, in the Starting Reactants

| Materials used, moles | | Molar ratio, Mn in $MnSO_4$/Mn in MnO (initially introduced) | Weight of product, gm. | Filtrate Mn, g./l. | Analysis of product | | | Percent $MnSO_4$ reacted with MnO |
|---|---|---|---|---|---|---|---|---|
| $MnSO_4 \cdot H_2O$ | MnO | | | | Mn, percent | S, percent | Molar ratio Mn as $MnSO_4$/Mn as MnO | |
| 2.92 | 0.58 | 5.00:1 | 196.3 | 90.7 | 34.6 | 11.8 | 1.40:1 | 22.3 |
| 2.92 | 1.16 | 2.50:1 | 432.7 | 62.7 | 34.8 | 12.1 | 1.44:1 | 54.2 |
| 2.92 | 1.16 | 2.50:1 | 489.3 | 66.7 | 32.5 | 11.1 | 1.42:1 | 59.6 |
| 2.92 | 1.74 | 1.67:1 | 538.0 | 34.7 | 35.0 | 11.0 | 1.17:1 | 57.5 |
| 2.92 | 1.74 | 1.67:1 | 593.3 | 40.7 | 35.8 | 11.5 | 1.23:1 | 72.5 |
| 2.92 | 2.33 | 1.25:1 | 748.7 | 22.0 | 35.6 | 11.1 | 1.16:1 | 86.7 |

NOTE.—Initial ratios varied by increasing amounts of MnO with constant amounts of $MnSO_4$. Reaction at 200° F. for 30 minutes. 1,000 ml. solution in all cases.

Both Tables I and II show that as the concentration of $MnSO_4$ in the reaction medium increases (while maintaining a constant ratio of the starting reactants $MnSO_4 \cdot H_2O$ at low temperature, since in Table I only one sample, in which manganous sulfate was used at 3.49 moles per liter, had a high sulfur content which was comparable to the products of Table II, and as pointed out below this one product lacked the required stability.

It should also be noted that the pH of the reaction slurries for products prepared at low temperatures (Table I) decreased considerably (7.8–6.7) with increasing concentrations of manganous sulfate used, whereas the corresponding pH values for the products of Table II decreased only slightly (7.0–6.7). Since this decrease in pH is due to the reaction of increasing amounts of manganous oxide, it follows from these tables that at the higher temperature of Table II, the reaction goes to approximately the same high degree of completion for both the higher and lower concentrations of manganous sulfate used, whereas at the lower temperature of Table I the reaction is very incomplete at all except the highest concentration.

As previously stated, a high degree of reaction is important not only from the standpoint of yield, but also because it results in a molar ratio of Mn as $MnSO_4$ to Mn as MnO in the reaction product which is above the minimum of 1:1 necessary to provide adequate stability of the reaction product to hydrolysis. Both Tables I and II show that the reaction products become more stable toward leaching with increasing concentrations of manganous sulfate, as indicated by the increasing values of the molar ratio of $SO_4$ to MnO remaining in the leached residues. Comparison of Tables I and II, however, shows that larger amounts of sulfur remain in the products after leaching when they are prepared at the high temperature of reaction of Table II, and that there is less change in final sulfur content throughout the entire range of manganous sulfate concentrations used than in products prepared at the temperature of Table I. It should be noted that only one product of Table I satisfied the minimum requirement for a molar ratio of 1:1 of Mn as $MnSO_4$ to Mn as MnO, and this product lost over 50% of its sulfur content during leaching (containing 11.7% before but only 5.1% after leaching) and was less stable than the least stable product of Table II (containing 10.3% sulfur before and 6.4% sulfur after leaching).

Thus the most significant factor in rendering the reaction product stable toward leaching is a high temperature of reaction, such as 190°–205° F. At the higher temperatures of Table II, the minimum molar ratio of Mn as $MnSO_4$ to Mn as MnO was secured in each of the first four reaction products in the table, and in each of these four cases the product after leaching retained a large proportion of its initial sulfur content (e.g., 70% or more). In all of these cases the lowest value of the ratio $SO_4/MnO$ reached after leaching was 0.346. In the last two products of Table II, although the reaction temperature was still high, the aforesaid molar ratio (Mn as $MnSO_4$/Mn as MnO) was below the required minimum value with the results that both the sulfur content before leaching and the sulfur content after leaching were relatively low and the amount of sulfur retained after leaching was less than 60%. The corresponding drop in the value of the ratio $SO_4/MnO$ to 0.260 illustrates the adverse effect on stability of decreasing the concentration of $MnSO_4$ in the reaction medium. Thus high temperature alone is not enough to provide the results of the invention.

Table I further shows that the adverse effect of low temperature on stability is much greater than that of low concentration. In the first product of this table, the sulfur content before leaching, the ratio of Mn as $MnSO_4$ to Mn as MnO, and the ratio $SO_4/MnO$, are of the same order as in the second, third and fourth products of Table II, but the amount of sulfur remaining after leaching is less than 45% of that found in the original reaction products. The loss of sulfate group is shown by the decrease in the ratio $SO_4/MnO$ from 0.542 to 0.205 and this loss of course was even higher as the concentration of $MnSO_4$ in the reaction medium was reduced, the ratio $SO_4/MnO$ falling rapidly to practically negligible values. The increased stability obtained at the higher temperatures of Table II was unexpected and is very important because stability to hydrolysis, as indicated by high sulfur retention and high values of $SO_4/MnO$ after leaching, is an essential requirement for spray materials as explained above.

Table III shows that the proportion of manganous sulfate to manganous oxide in the starting reactants has a substantial effect on the ratio of Mn as $MnSO_4$ to Mn as MnO in the reaction product, but is more significant from the standpoint of the extent of completion of the reaction and yield of the reaction product. Evidently the molar ratio of the starting reactants

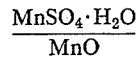
$$\frac{MnSO_4 \cdot H_2O}{MnO}$$

must be at least 1:1 in order to meet the above stated minimum requirement in the reaction product. Table III shows a range of ratios above this minimum which were obtained by using increasing amounts of manganous oxide, the same favorably high concentration of $MnSO_4$ in the reaction medium and high temperature being maintained throughout. Under these conditions increases in the proportion of the starting reactant MnO resulted in material decreases in the ratio of Mn as $MnSO_4$ to Mn as MnO in the reaction product, indicating decreased stability, although in all cases the value of this ratio was above the minimum of 1:1 prescribed above. However, as the amount of manganous oxide was increased, the extent of reaction was greatly increased and an increasing amount of manganous sulfate was reacted and converted into the solid product.

Therefore, a molar ratio of the starting reactants (manganous sulfate to manganous oxide) above but near 1:1 is the optimum ratio from the standpoint of maximum reaction, and produces a neutral reaction product having good stability. It may be advantageous, however, to use manganous sulfate in substantial excess of this minimum proportion in order to reduce the pH of the overall reaction slurry and thus to minimize the tendency of the manganous oxide (and in turn the neutral manganese product) to be oxidized, during the course of the reaction, to forms which are useless for plant nutrition. Also when manganous sulfate is initially in excess, the ratio of Mn as $MnSO_4$ to Mn as MnO and the ratio of $SO_4$ to MnO in the reaction product are higher with the advantage of greater stability as described above. Considerable amounts of manganous sulfate may remain unreacted, but may always be used in subsequent reactions.

It is to be understood that the foregoing limitations of temperature, concentration, and molar ratios, although illustrated only with respect to the sulfate, are applicable also to the chloride and nitrate.

It is to be understood that the invention includes not only the above process of manufacturing the neutral manganese composition and the resulting product, but also the use of this product in agricultural products, such as commercial fungicidal and insecticidal materials, in the form of foliar sprays or dusts, as well as in combination with commercial fertilizers which contain nitrogen, phosphorous, and potassium as major nutrients for soil application. It will be evident to those skilled in the art that this neutral manganese composition is especially suitable for the uses listed above because of its unique combination of properties, namely:

(a) The retention of its manganese content in the divalent form, which plants can utilize as a nutrient.

(b) Its stability toward leaching in water suspension, with the result that divalent manganese is supplied to plants at the slow, steady rate desired for plant nutrition and an application of the composition is thus effective for long periods of time.

(c) Its neutral character of reaction, which renders it compatible with other agricultural products, and safe for foliar application as well.

A typical procedure for manufacturing a neutral manganese composition embodying the present invention has been set forth above. The following typical examples illustrate various uses of the resulting composition in agricultural formulations:

(1) For spraying:
   100 gallons water.
   4–6 pounds neutral manganese composition.
   Apply 150–200 gallons per acre.

(2) For spraying:
   100 gallons water.
   4–6 pounds neutral manganese composition.
   Commercial fungicide and/or insecticide, in amounts determined by crop requirements and field conditions, when the character of reaction of the resulting slurry falls within the range of pH 6.0–8.0.

(3) For spraying:
   100 gallons water.
   4–6 pounds neutral manganese composition.
   4–10 pounds of neutral or "fixed" compounds of other trace elements, such as basic copper sulfate, basic zinc sulfate, or ferrous oxalate, and mixtures thereof.

(4) For spraying:
   100 gallons water.
   4–10 pounds neutral manganese composition.
   Various amounts of soluble compounds of nitrogen, phosphorus, or potassium, and mixtures thereof, formulated for the purpose of supplying these elements to the foliage of growing plants, with the provision that the character of reaction of the final slurry, containing the neutral manganese composition, shall not fall below pH 6.0.

(5) For dusting:
   12–18 pounds neutral manganese composition.
   Balance (to total of 100 pounds mixture): inert clay of type commonly used in agricultural dusting formulations as "fillers." Apply 50 pounds per acre.

(6) For dusting:
   12–18 pounds neutral manganese composition.
   12–25 pounds of neutral or "fixed" compounds of other trace elements, such as basic copper sulfate, basic zinc sulfate, or ferrous oxalate, and mixtures thereof.
   Balance (to total of 100 pounds mixture): inert clay.

(7) For soil treatment:
   1 ton of commercial grade fertilizer designed to supply major plant nutrients, such as nitrogen, phosphorus, potassium, and calcium, in the form of soil supplements.
   50–200 pounds neutral manganese composition.

(8) For soil treatment:
   1 ton commercial fertilizer, as in (7).
   50–200 pounds neutral manganese composition.
   50–200 pounds soluble or neutral compounds of other trace elements, or mixtures thereof.

It will be seen that the conditions set forth above make possible the efficient production of neutral manganese compositions which are stable toward hydrolysis in water suspension and are therefore stable against subsequent oxidation. These compositions, in turn, are entirely safe for direct application to plant foliage in the form of either spray or dust for the correction of manganese deficiencies. Due to the neutral character of reaction of these compositions, they cause no injury even to crops which are supersensitive to alkaline or acid spray applications, such as beans.

The neutral manganese compositions of the present invention are very economical since they are manufactured from plentiful raw materials and the method of manufacture is one of the simplest possible, even a washing operation being unnecessary. The products retain their chemical stability in storage, since they are not hygroscopic (their moisture content is less than 1%), and their stability toward hydrolysis does not change. Their compatibility with other agricultural products, especially the commonly used fungicidal and insecticidal materials, enables substantial economies to be effected in the field.

Field tests on the performance of manganese compositions embodying the invention, in the form of both spray and dust, have been conducted at the Indiana Experiment Station (Lafayette, Indiana). The spray contained 4–6 pounds of neutral manganese composition per 100 gallons of water, and was applied at the rate of 150–200 gallons per acre; while the dust contained 12–18 pounds of the manganese composition per 100 pounds of dust, the balance consisting of inert clay, and was applied at the rate of 50 pounds per acre.

Results showed that legumes, such as soy beans, crotolaria, and lespedeza, give good response to both spray and dust treatments, with resulting higher yields and without the slightest injury to foliage. The same composition was also found to be both safe and effective for the correction of manganese deficiencies in grain crops, such as oats, which develop what is known as "gray spot" when there is a manganese deficiency in the soil on which they are grown.

It will be understood that the invention is not restricted to the details of the foregoing description, nor otherwise than by the terms of the appended claims to which reference should be had for a definition of its limits.

What is claimed is:

1. The process of producing a substantially neutral manganese composition for use in agricultural sprays and dusts which contains manganese in divalent form and is resistant to hydrolysis, comprising reacting manganous oxide in an aqueous reaction medium with a water-soluble manganous salt of an inorganic acid selected from the group consisting of sulfuric, hydrochloric and nitric acids, the temperature of the reaction being maintained between 190° F. and the boiling point of the reaction slurry, the initial concentration of said manganous salt in the reaction medium being between 1.8 moles per liter and the saturation concentration, and the molar ratio of manganese introduced into the reaction slurry in the form of said manganous salt to the manganese introduced in the form of manganous oxide being in the range of 1:1 to 5:1.

2. The process of producing a substantially neutral manganese composition for use in agricultural sprays and dusts which contains manganese in divalent form and is resistant to hydrolysis, comprising reacting manganous oxide in an aqueous reaction medium with a water-soluble manganous salt of an inorganic acid selected from the group consisting of sulfuric, hydrochloric and nitric acids while maintaining the temperature of the reaction medium between 190° F. and 220° F. at atmospheric pressure, the initial concentration of said manganous salt in the reaction medium being between 1.8 moles per liter and the saturation concentration, and the molar ratio of manganese introduced into the reaction slurry in the form of said manganous salt to manganese introduced in the form of manganous oxide being in the range of 1:1 to 2:1.

3. The process of producing a stable, substantially neutral composition containing divalent manganese for use in agricultural sprays and dusts which comprises reacting manganous sulfate and manganous oxide in an aqueous medium at a temperature between 190° F. and 220° F., the proportions of the reactants being such as to provide a molar ratio of Mn in $MnSO_4$ to Mn in MnO which is in the range of 1:1 to 5:1, and the initial concentration of manganous sulfate in the reaction medium being in the range of 1.8–4.7 moles per liter.

4. The process of producing a stable, substantially neutral composition containing divalent manganese for use in agricultural dusts and sprays which comprises reacting manganous sulfate and manganous oxide in an aqueous medium at a temperature between 190° F. and 220° F., the proportions of the reactants being such as to provide a molar ratio of Mn in $MnSO_4$ to Mn in MnO which is between 1:1 and 2:1, and the initial concentration of manganous sulfate in the reaction medium being in the range of 3.5 to 4.7 moles per liter.

5. A substantially neutral manganese composition for use in agricultural dusts and sprays, said composition containing divalent manganese in the form of the manganous salt of an acid selected from the group consisting of sulfuric, hydrochloric and nitric acids and in the form of manganous oxide in the molar ratio of 1:1 to 1.5:1, said composition having a substantially neutral character of reaction and being substantially stable against hydrolysis and oxidation, said composition having been prepared by reacting manganous oxide in an aqueous reaction medium with a water-soluble manganous oxide in an aqueous reaction medium with a water-soluble manganous salt of said selected acid, the temperature of the reaction being maintained between 190° F. and the boiling point of the reaction slurry, the initial concentration of said manganous salt in the reaction medium being between 1.8 moles per liter and the saturation concentration, and the molar ratio of manganese introduced into the reaction slurry in the form of said manganous salt to the manganese introduced in the form of manganous oxide being in the range of 1:1 to 5:1.

6. A composition for application to the foliage of growing plants comprising the combinatoin of a manganese composition as defined in claim 5 and a pesticide.

References Cited in the file of this patent

UNITED STATES PATENTS

| 1,703,362 | Popoff | Feb. 26, 1929 |
| 2,804,382 | Nikitin | Aug. 27, 1957 |

OTHER REFERENCES

Mellor: "A Comprehensive Treatise on Inorganic and Theoretical Chemistry," vol. XII, published by Longmans, Green and Co., New York, 1932, pages 357, 410 and 444 relied on.

UNITED STATES PATENT OFFICE
CERTIFICATE OF CORRECTION

Patent No. 3,057,712

October 9, 1962

Alexander A. Nikitin et al.

It is hereby certified that error appears in the above numbered patent requiring correction and that the said Letters Patent should read as corrected below.

Column 1, line 72, for "used when" read -- when used --; column 3, line 13, after "known", insert a comma; column 4, line 75, for "tables" read -- Tables --; column 11, lines 13 and 14, strike out "oxide in an aqueous reaction medium with a water-soluble manganous".

Signed and sealed this 18th day of June 1963.

(SEAL)
Attest:

ERNEST W. SWIDER
Attesting Officer

DAVID L. LADD
Commissioner of Patents